United States Patent
Yao et al.

(10) Patent No.: US 10,943,059 B2
(45) Date of Patent: Mar. 9, 2021

(54) DOCUMENT EDITING MODELS AND MANAGEMENT

(71) Applicant: MICROSOFT TECHNOLOGY LICENSING, LLC, Redmond, WA (US)

(72) Inventors: Zhenyu Yao, Seattle, WA (US); Sharon Hang Li, Redmond, WA (US); Maninder jit Singh Dhaliwal, Redmond, WA (US); Karvell Ka Yiu Li, Bellevue, WA (US); Yimeng Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/020,994

(22) Filed: Jun. 27, 2018

(65) Prior Publication Data

US 2020/0004808 A1 Jan. 2, 2020

(51) Int. Cl.
*G06F 40/166* (2020.01)
*G06F 3/0482* (2013.01)
*G06N 20/00* (2019.01)
*G06F 40/106* (2020.01)
*G06F 40/232* (2020.01)

(52) U.S. Cl.
CPC .......... *G06F 40/166* (2020.01); *G06F 3/0482* (2013.01); *G06F 40/106* (2020.01); *G06F 40/232* (2020.01); *G06N 20/00* (2019.01)

(58) Field of Classification Search
CPC ...... G06F 17/24; G06F 3/0482; G06F 17/212; G06F 17/273; G06N 20/00
See application file for complete search history.

(56) References Cited

U.S. PATENT DOCUMENTS

| | | | | |
|---|---|---|---|---|
| 6,591,265 | B1* | 7/2003 | Erickson | G06F 21/316 |
| 9,514,417 | B2* | 12/2016 | Kumar | G06Q 10/107 |
| 10,671,281 | B2* | 6/2020 | Zhai | G06F 3/0237 |
| 2005/0222985 | A1 | 10/2005 | Buchheit et al. | |
| 2006/0253427 | A1* | 11/2006 | Wu | G06F 16/90324 |
| 2011/0296300 | A1* | 12/2011 | Parker | G06Q 10/101 715/256 |
| 2012/0246563 | A1* | 9/2012 | Nusbaum | G06F 17/24 715/256 |

(Continued)

FOREIGN PATENT DOCUMENTS

WO 2017196685 A1 11/2017

OTHER PUBLICATIONS

"International Search Report and Written Opinion Issued in PCT Application No. PCT/US2019/016208", dated Mar. 28, 2019, 13 Pages.

*Primary Examiner* — Mandrita Brahmachari
(74) *Attorney, Agent, or Firm* — NovoTechIP International PLLC

(57) ABSTRACT

A mechanism and model by which to manage inadvertent edits of electronic content. The model determines the likelihood of whether a modification made to a document is intentional or was inadvertent and assist users in identifying these edits. The proposed devices and method can significantly improve workflow efficiency and allow users to feel more comfortable in the development and use of their electronic content, and/or reduce the possibility of other users causing accidental or unintentional errors in a document.

20 Claims, 14 Drawing Sheets

(56) References Cited

U.S. PATENT DOCUMENTS

| | | | |
|---|---|---|---|
| 2012/0265520 A1* | 10/2012 | Lawley | G06F 17/273 |
| | | | 704/9 |
| 2013/0191719 A1 | 7/2013 | Underhill et al. | |
| 2013/0198257 A1 | 8/2013 | Simmons et al. | |
| 2014/0104320 A1* | 4/2014 | Davidson | G09G 5/32 |
| | | | 345/681 |
| 2014/0310213 A1* | 10/2014 | Badger | G06F 3/0237 |
| | | | 706/12 |
| 2014/0310345 A1 | 10/2014 | Megiddo et al. | |
| 2015/0113072 A1* | 4/2015 | Chan | G06F 17/273 |
| | | | 709/206 |
| 2015/0120724 A1* | 4/2015 | Prager | G06F 16/93 |
| | | | 707/736 |
| 2015/0169531 A1 | 6/2015 | Campbell et al. | |
| 2016/0147788 A1* | 5/2016 | Ables | G06F 16/178 |
| | | | 707/625 |
| 2016/0371241 A1 | 12/2016 | Wong et al. | |
| 2017/0010869 A1* | 1/2017 | Heiney | G06F 17/248 |
| 2017/0075584 A1* | 3/2017 | Tormasov | H04L 63/0428 |
| 2017/0140025 A1 | 5/2017 | Milvaney et al. | |
| 2017/0177182 A1 | 6/2017 | Wong et al. | |
| 2017/0193201 A1* | 7/2017 | Eccleston | G06F 21/10 |
| 2017/0285890 A1 | 10/2017 | Dolman | |
| 2017/0323089 A1* | 11/2017 | Duggal | H04W 4/00 |
| 2017/0364866 A1 | 12/2017 | Steplyk et al. | |
| 2018/0189311 A1* | 7/2018 | Newhouse | G06F 16/1734 |
| 2018/0276745 A1* | 9/2018 | Paolini-Subramanya | |
| | | | G06Q 40/025 |
| 2019/0205372 A1* | 7/2019 | Li | G06N 20/00 |
| 2019/0251197 A1 | 8/2019 | Li et al. | |

\* cited by examiner

| Feature | Description |
|---|---|
| HoursSinceLastEditedByUser | Hours since this file was last edited by this user over the past X days |
| FileExtensionGroup | If file accessed was Word, Excel, or PPT, or other file type |
| HoursSinceLastEdit | Hours since this file was last edited by any users in the past X days |
| NumTimesDocEdited | Number of times this file was edited any (all) users in the last X days |
| NumWXPDocumentRead | The distinct number of WXP files the user read in the last X days |
| NumExcelDocumentRead | The number of Excel files the user read in the last X days |
| NumTimesDocEditedByUserInWeek | The number of files the user read in the last 7 days |
| HoursSinceLastOpenByUser | Hours since the user opened any files |

510 — HoursSinceLastEditedByUser
520 — FileExtensionGroup
530 — HoursSinceLastEdit
540 — NumTimesDocEdited
550 — NumWXPDocumentRead
560 — NumExcelDocumentRead
570 — NumTimesDocEditedByUserInWeek
580 — HoursSinceLastOpenByUser

FIG. 5

| Content Element | Class | Subclass |
|---|---|---|
| A rainbow is a meteorological phenomenon | Weather | Rainbows |
| Rainbows are caused by reflection, refraction and dispersion of light in water droplets | Weather | Rainbows |
| Rainbows caused by sunlight always appear in the section of sky directly opposite the sun | Weather | Rainbows |
| The domestic cat is a small, typically furry, carnivorous mammal | Animals | Cats |
| Rainbows span a continuous spectrum of colours | Weather | Rainbows |
| When sunlight encounters a raindrop, part of the light is reflected and the rest enters the raindrop | Weather | Rainbows |

FIG. 6

DOCUMENT EDITING MODELS AND MANAGEMENT

BACKGROUND

Electronic documents typically contain digital content such as text, images, and spreadsheets. During the drafting of a document, the content can be significantly revised over a period of time by multiple people. Some document-editing applications—such as certain word processors—permit revisions or changes to be made to the document by multiple users, storing them in the file that constitutes the document.

It is common for a collaborative editing and review process to be used in the development and review of word processing documents. Collaborative document management processes are facilitated by the presence of communication networks to bring a wide variety of participants together to accomplish common goals. For example, many documents generated in today's electronic society are created by one or more individuals, and then further subject to review by several others. The documents to be reviewed are created as a form of electronic content that is forwarded to others for review and revision, or general template use, perhaps via an electronic network.

Authors and reviewers participating in this shared process typically insert edits and comments to a version of the document that is stored in a network or cloud. The cloud-based applications supporting such online documents are often configured to autosave any changes that are made to the document. However, in some cases, edits that are unintentional or accidental can be made to a document and subsequently be saved, without the awareness of the user(s). Thus, there remain significant areas for new and improved ideas for minimizing undesired edits to a document, as well as providing users with tools for the management of such edits.

SUMMARY

A device for detecting inadvertent edits to electronic content, in accord with a first aspect of this disclosure, includes one or more processors and one or more computer readable media including instructions which, when executed by the one or more processors, cause the one or more processors to determine that a first triggering event has occurred during access of a first electronic content, where the first triggering event including a modification of a portion of the first electronic content by a first user from an initial state to a modified state. The instructions further cause the one or more processors to determine, in response to the first triggering event, that the modification was inadvertent based on at least a usage history for the first user or a usage history for the electronic content. In addition, the instructions cause the one or more processors to cause, in response to the determination that the modification was inadvertent, the application to present a first user interface element including a first option and a second option. Furthermore, the instructions cause the one or more processors to revert, in response to receiving a first user input indicating a selection of the first option, the portion of the first electronic content from the modified state to the initial state.

A device for avoiding inadvertent edits to electronic content, in accord with a second aspect of this disclosure, includes one or more processors and one or more computer readable media including instructions which, when executed by the one or more processors, cause the one or more processors to determine a first usage history associated with a first electronic content. The instructions further cause the one or more processors to determine, by applying a first machine learning algorithm to the first usage history, that the first electronic content is associated with a low likelihood of being modified by a first user. In addition, the instructions further cause the one or more processors to detect a modification of the first electronic content by the first user, and to determine, upon detection of the modification of the first electronic content, that the modification was inadvertent based on the determination that the first electronic content is associated with the low likelihood of being modified by the first user. Furthermore, the instructions further cause the one or more processors to cause, in response to the determination that the modification was inadvertent, a first user interface element including a first option and a second option to be presented to the first user, as well as revert, in response to receiving a first user input indicating a selection of the first option, the modification to the first electronic content.

A method, in accord with a third aspect of this disclosure, includes determining that a first triggering event has occurred during access of a first electronic content. The first triggering event includes a modification of a portion of the first electronic content by a first user from an initial state to a modified state. The method also includes determining, in response to the first triggering event, that the modification was inadvertent based on at least a usage history for the first user or a usage history for the electronic content. A third step includes causing, in response to the determination that the modification was inadvertent, the application to present a first user interface element including a first option and a second option. The method further includes reverting, in response to receiving a first user input indicating a selection of the first option, the portion of the first electronic content from the modified state to the initial state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is a table presenting some examples of structured data features for use by an edit management system;

FIG. 6 is a table presenting some examples of unstructured data features for use by an edit management system;

DETAILED DESCRIPTION

Figure 1:
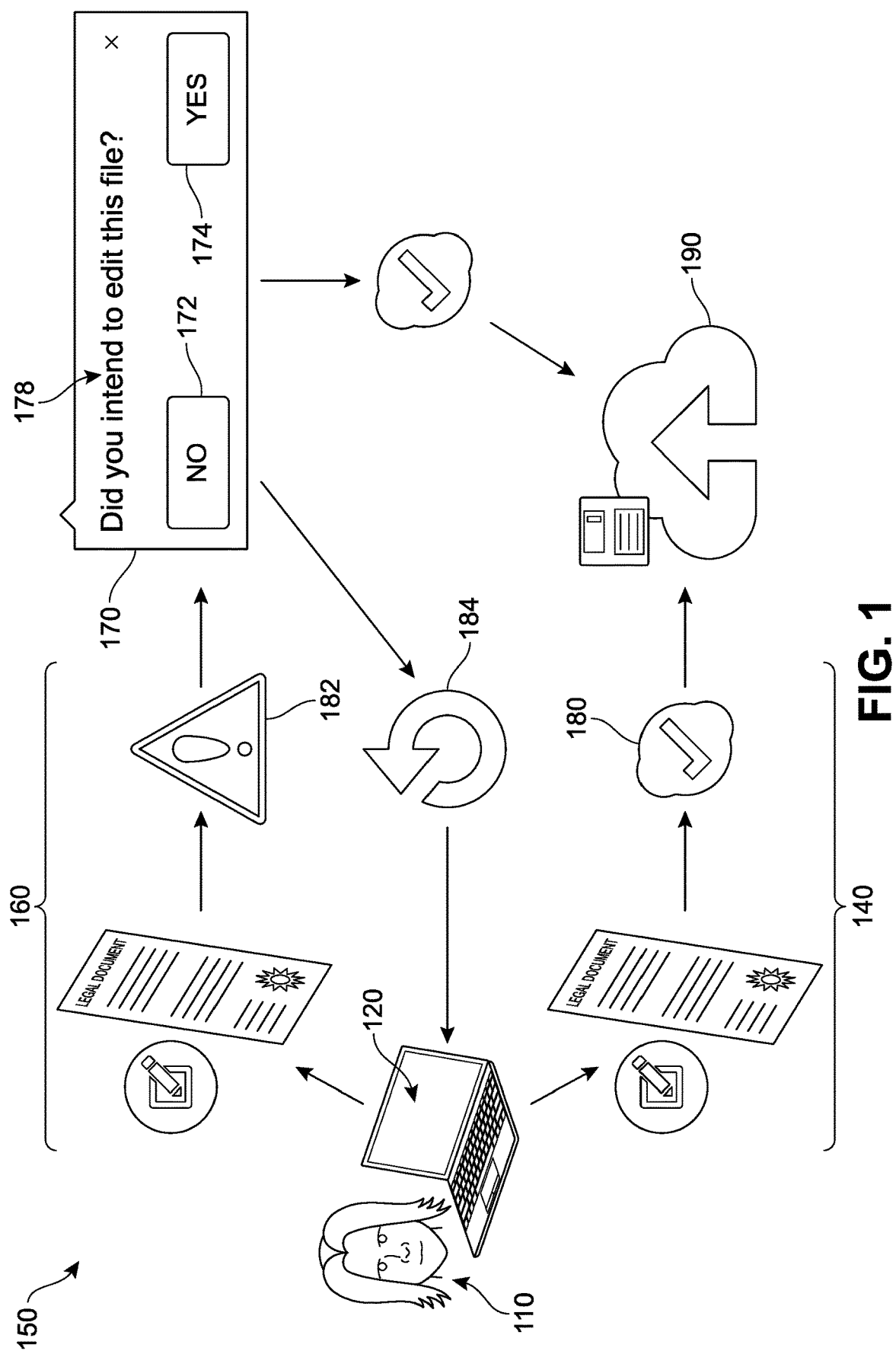
FIG. 1 is a conceptual diagram illustrating an implementation of an edit management environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As users develop or review various types of electronic content, particularly during the drafting of larger documents and/or collaborative larger projects, a common challenge is preventing or removing accidental edits or changes made to the content. The following systems and methods are designed to assist users in managing inadvertent edits of electronic content. In some implementations, a model determines the likelihood of whether a modification made to a document is intentional or was inadvertent, and then assists users in identifying these edits.

As introduced above, applications such as word processors, publishers, spreadsheets, presentations, and others can be used to generate electronic documents or content. For purposes of this description, the term "electronic content" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include word or other text-based documents.

The electronic content can be understood to include or be segmented into one or more portions that will be referred to as content elements. Thus, a "content element" in this description includes any part of electronic content that is defined or discernable as a part. For example, a content element may be automatically discerned from a characteristic of the content element itself (e.g., a letter, number, word, sentence, paragraph, section, image, symbol, or chapter of an electronic document, or other file format designation) or may be manually defined by a reviewer (e.g., a reviewer-selected collection of words in an electronic document, a reviewer-selected portion of a digital image, a reviewer-selected slide from a presentation). Examples of content elements include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

In addition, an end-user for purposes of this application is one who creates, edits, authors, views, develops, manages, reviews, revises, or deletes pieces of electronic content, including the creation or updating of comments associated with the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®) and other applications provide revising, editing, commenting and annotating tools. For example, Microsoft Word® offers users tools such as Comments, Highlight, Underline and other formatting options, Track Changes, Compare, among others, to add comments or make changes to a document. In other applications such as Google Docs® a "Suggestion Mode" may be used to suggest modifications or provide feedback for a document. These are non-limiting examples, and any other electronic content editing or collaboration application may benefit from the disclosed implementations. Specific references to a software application by name throughout this description should not therefore be understood to limit the use of the proposed systems and methods.

Once a change is made to a shared document, the document may present the changes in a substantially real-time manner to other users. Such 'instantaneous' updates can be used to facilitate collaborative workflows. For purposes of this description, data or documents being developed collaboratively include any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative process is the cooperation of multiple reviewers to view, comment on, and make changes to a document as part of a shared review activity.

In scenarios where multiple authors and/or reviewers are collaborating to produce a document, various parts of the document may be authored and/or revised at different times or during different stages of document development. For example, a first portion of the document may be finalized, a second portion of the same document may be in the midst of revisions, and a third portion within the same document may be in an initial drafting stage. Thus, edits may be made across various portions of the document, and when unintentional changes occur, these may not be 'caught' or detected in a timely manner, if at all. In addition, a single author accessing a document may inadvertently make a change to the document without realizing the change has occurred. In some cases, authors must review a document sentence by sentence to ensure such inadvertent edits are removed prior to finalization and/or attempt to run auto-searches for various grammatical errors that may be associated with the unintentional edits. These reviews are both time-consuming and can produce inconsistent content, reducing efficiency of the development or completion of a document.

Figure 3:
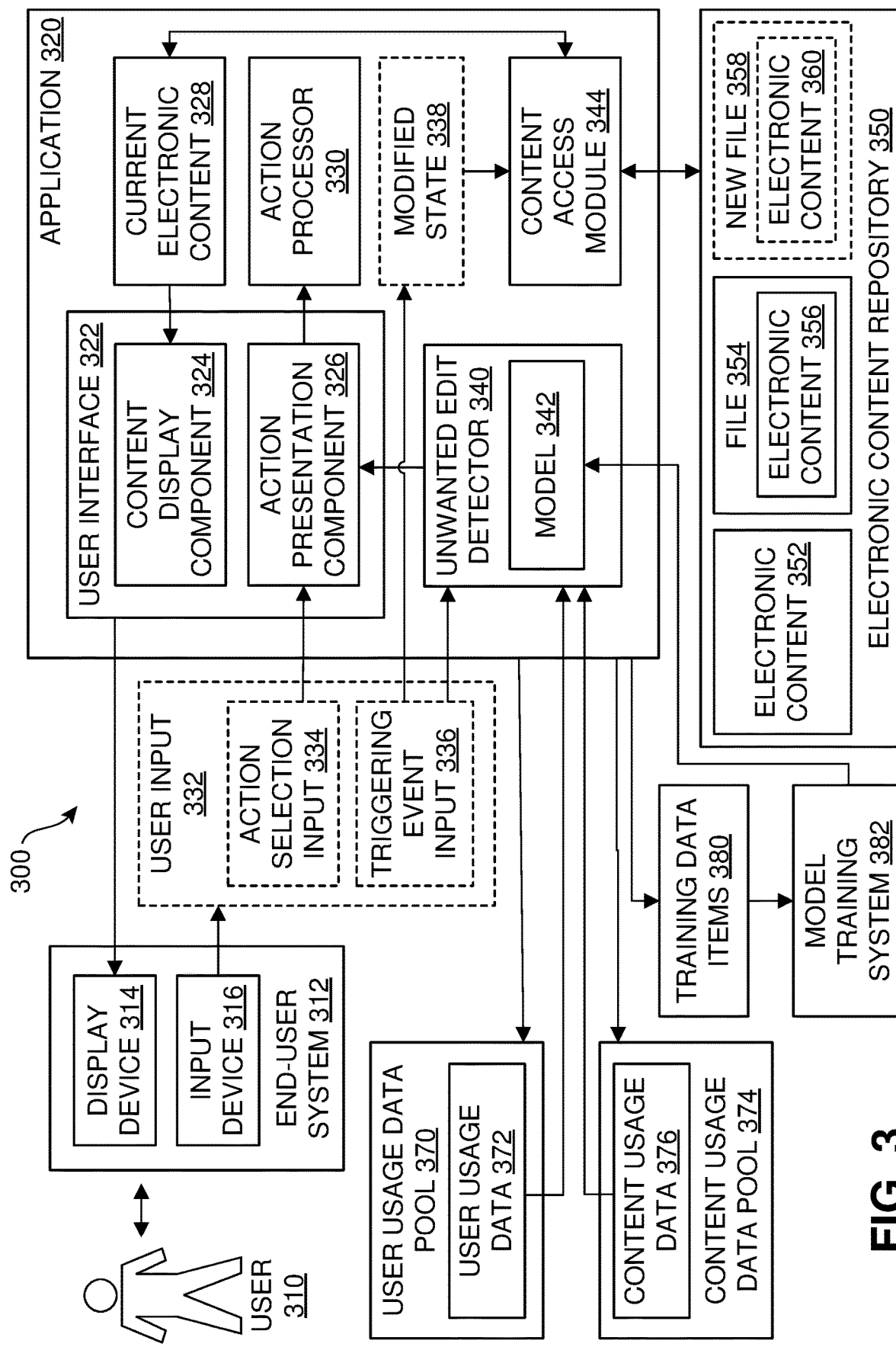
FIG. 3 is a conceptual diagram illustrating an implementation of a distributed computing environment for managing edits.

In order to better introduce the systems and methods to the reader, FIG. 1 presents a high-level example of a representative document editing environment ("environment") 150 for implementing an electronic content edit management system (illustrated schematically in FIG. 3). In different implementations, the environment 150 can include one or more computing device end-users, or simply "users". One or more users can interact with or manipulate data presented via a user device.

As an example, a first user 110 is shown in FIG. 1. In this case, the first user 110 is accessing a document 100 on a first device 120. It can be understood that the first device 120 is connected to a cloud-based computing service and storage ("cloud storage") 190. As first user 110 works on a live document, various pieces or segments of the document may be modified or otherwise accessed at various times and across various devices and be updated or saved in the cloud storage 190. In one implementation, multiple users can access the same document at the same time and make changes that are presented in real-time to other users. Thus, workflow may occur via multiple 'streams' that are configured to push data and pull data from a central repository or cloud network.

In this example, the first user 110 is reviewing a document and, during the course of this review, has modified a portion of the document. As will be discussed in further detail below, in some cases, the modification may be intentional (see a first path 140) or unintentional (see a second path 160). In the case where the system detects a history of usage or usage history characteristics that are consistent or associated with an intentional edit (represented by a first symbol 180), the system will continue to operate or run as per a standard editing mode for the application. Thus, following the first path 140, the document 100 can be edited and these edits can be saved to some type of storage medium, whether locally or on a network, such as cloud storage 190.

However, in cases where the system detects a history of usage or behavior that indicates a significant likelihood that the first user 110 has made an inadvertent edit(s) to the document 100, the application can be configured to present various options or notifications to the first user 110. Implementations of this process will be described in greater detail below. As one example, illustrated by the second path 160, the system can generate an alert (represented as a second symbol 182) that is associated with the document 100, and is presented to the first user 110. An example of such an alert is shown in FIG. 1 in the form of a native control 170.

For purposes of this description, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls.

The native control 170 in FIG. 1 is configured to offer the first user 110 information regarding its classification or assessment of the edit that was just made, thereby providing notice to the user that there may have been a change to the document that was unwanted or inadvertent. In some implementations, the notification includes a query 178 with response options such as a first option 172 ("NO") and a second option 174 ("YES"). The query 178 in this case asks the first user 110 whether they intended to edit this file. In other words, the application can request confirmation of its intentionality assessment of the edit. The user may respond to the query and thereby provide validation or feedback to the system by the selection of one of the two options. It should be understood that a user may opt to not to respond at all and instead ignore or dismiss the native control 170 (for example, by closing or minimizing the window, or by ignoring the dialog window and continuing to work within the document).

If a user selects the first option 172, the application may be configured to automatically undo or remove the edit that was made, as represented by a third symbol 184. Other implementations discussed below may include alternate or additional actions that can be triggered by the selection of the first option 172. In some implementations, if a user selects the second option 174, the system can reclassify the edit, offer the user the opportunity to save the document or make additional changes, and/or proceed with autosaving the edit.

As a general matter, it can be understood that unwanted edits pose an issue that can diminish a user's experience, impede the productivity and accuracy of a user when accessing or generating a document, as well as affect the workflow of other users collaborating on the document. For purposes of this disclosure, the term "inadvertent edit" refers to any change or modification to electronic content that is unwanted, undesired, accidental, unintentional, erroneous, mistaken, or otherwise not deliberate on the part of the user. Some common examples of inadvertent edits include the "fat fingers" phenomenon in which the user accidentally changes a document (i.e., a small typo), as well as more purposeful changes that are made at the wrong time or in the wrong document, such as but not limited to edits made to an original document when the user had actually intended to save a new copy of the document and neglected to select "Save As" before modifying the original content. In the latter case, the modified document may be auto-saved with the accidental edit, replacing the original file, or the user may not realize that they are actually modifying the original document and proceed with a manual save of the document and the changes. In addition, while accidental typos are sometimes detected by grammatical checks, typos can frequently be non-obvious or unapparent, and the user may end up saving or even finalizing the document with such inadvertent edits.

The proposed systems and methods are aimed to help minimize or prevent these and other types of inadvertent edit scenarios. In some implementations, the application running the electronic content can be associated with machine learning algorithms (MLAs) to improve a user's experience by increasing awareness of inadvertent edits and guiding or assisting them in an undo of any unintended changes. In order to provide further context for the uses and applications of the systems described herein, FIG. 2 presents one non-limiting example of an inadvertent edit.

Figure 2:
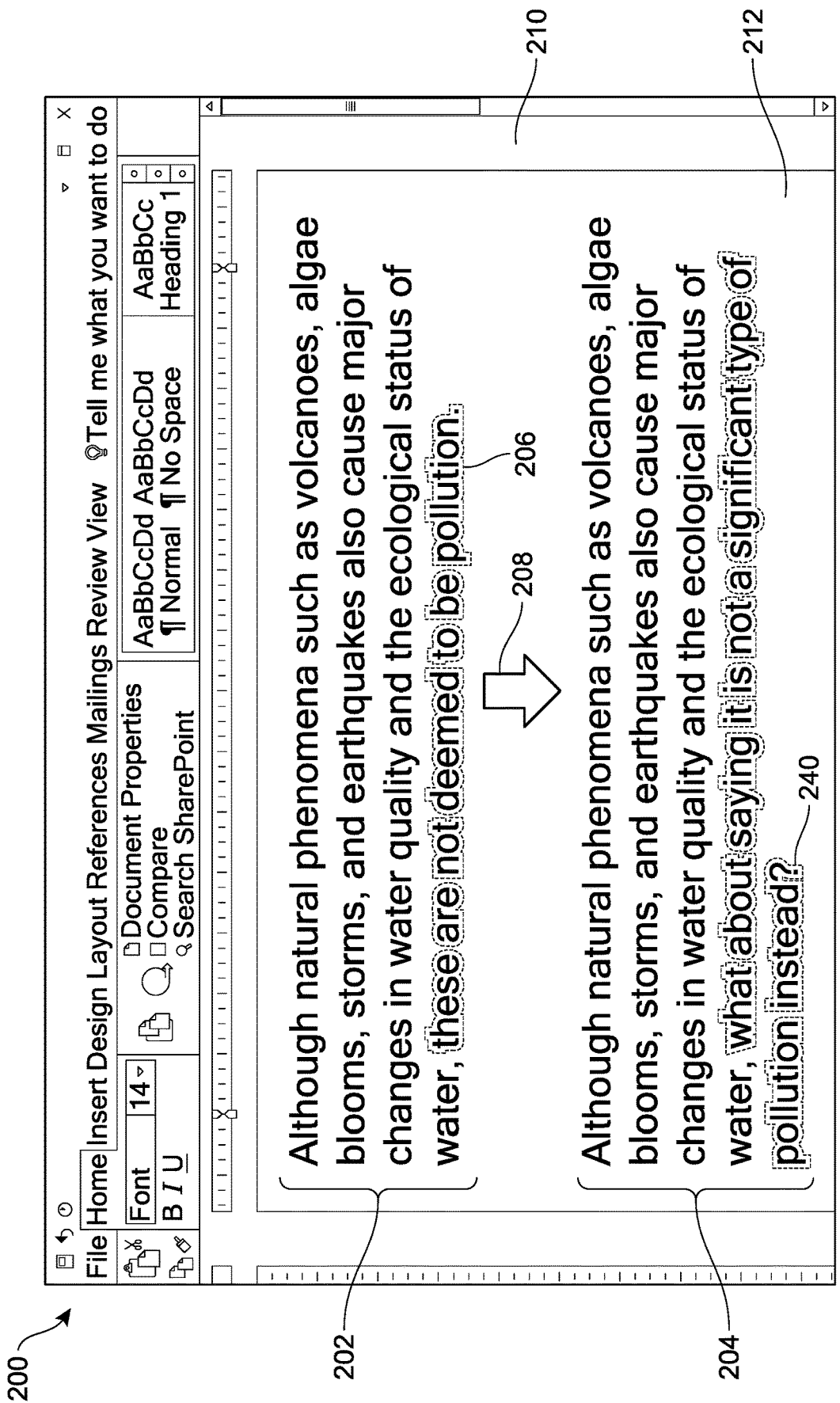
FIG. 2 is a display diagram illustrating an example of an inadvertent edit.

In FIG. 2, an implementation of a display 200 for a computing device is illustrated. In different implementations, the display 200 may present various icons or graphical representation, interfaces, applications, or other device status information. As an example, the display 200 includes an interface for a first application 210. For purposes of simplicity, the first application 210 in FIG. 2 is a word processor program displaying a document page ("document") 212. In one implementation, the first application 210 may be understood to represent a version of Microsoft Word®, or another word processing program, such as Apple Pages®, Corel WordPerfect®, Google Docs®, IBM Lotus Word Pro® and other word editing programs. However, in other implementations, the first application 210 may include any other software applications within the Microsoft Office Suite® or array of Microsoft® products as well as any non-Microsoft® based applications.

While only one document is illustrated in FIG. 2, it should be understood that an arrow 208 extending between an original content 202 and a modified content 204 schematically represents a "before and after" type scenario. A user (such as a reviewer) may access the original content 202 and, during review of the document 212, decide to add a comment for other users to consider. However, while the reviewer highlights a first content element 206 to specify the portion of the original content 202 for they wish to provide feedback, the reviewer accidentally or inadvertently types a comment 240 directly into the document, thereby replacing the selected original text with new text (see modified content 204). The reviewer then continues reading the document and fails to notice their mistake. Thus, the document 212 now includes text that is inappropriate or undesired. These types of mistakes can diminish the quality of the overall work product, and decrease the efficiency of document review. As will be discussed further below, this and other types of inadvertent edits can be substantially minimized or prevented by the use of the proposed systems.

Referring now to FIG. 3, an example of a representative architecture of a content element management system ("system") 300 is depicted. In different implementations, the system 300 can be configured to present user interfaces for identifying and responding to unwanted edits. The system 300 can be further configured to present additional user interfaces. It can be understood that the system 300 presented here is merely an example implementation and that a wide variety of other implementations are possible.

In different implementations, the system 300 can include one or more end-user systems 312 (only one end-user system 312 is shown in FIG. 3). The first user 310 is making use of the end-user system 312. The end-user system 312 includes a display device 314 used in connection with an application 320 to display graphical elements generated by a user interface 322 to the first user 310. The end-user system 312 also includes one or more input devices 316 used to receive commands or other input from the user 310, from which the end-user system 312 is configured to generate corresponding user input 332 for the application 320. Each of the users (such as the first user 310) of the application 320 may be associated with different user identifiers, such as usernames and/or numbers.

The user interface 322 included in the application 320 generates various graphical user interfaces for viewing and editing a current electronic content 328. In some examples, the current electronic content 328 has been retrieved, using a content access module 344, from an electronic content repository 350; for example from an electronic content 352 stored in the electronic content repository 350, or from an electronic content 356 included in a first file 354 stored in the electronic content repository 350. The user interface 322 may be configured to generate the various user interfaces described above in connection with FIGS. 1-9, including but not limited to the menus, submenus, options, sub-options, indicators, dialog boxes, and other input or presentation interfaces. In addition, the user interface 1030 may be configured to generate the user interfaces described further below with respect to FIGS. 11-14. The user interface 322 includes a content display component 324 configured to cause portions of the current electronic document 328 to be presented on the display device 312.

As described in this disclosure, the first user 310 may cause a triggering event input 336 to be generated, which indicates a modification to be made to the current electronic content 328. The state of the current electronic content 328 before the application receives the triggering event input 336 may be referred to as an "original," "initial," or "unmodified" state for the current electronic content 328. In response to receiving the triggering event input 336, the application 320 determines a corresponding modified state 338 for the current electronic content 328. Also in response to receiving the triggering event input 336, an unwanted edit detector 340 determines, based on at least user usage data 372 (which may be referred to as a "user usage profile", "recorded user usage" or "user usage history") for the first user 310 and/or content usage data 376 ("content usage history", or "recorded content usage" or "content usage record") for or associated with the current electronic content 328 itself (including but not limited to metadata, structured data, and unstructured data), whether the first user 310 instructed the application 320 to make an unwanted or inadvertent modification to the current electronic content 328. The user usage data 372 indicates use of the application 320, and possibly other applications, by the first user 310. In some examples, as illustrated in FIG. 3, the user usage data 372 is included in a user usage data pool 370 storing similar usage data for a larger number of users. The application 320 may be configured to collect portions of the user usage pool data 370. In some examples, as illustrated in FIG. 3, the content usage data 376 is included in a content usage data pool 374 storing similar usage data for a larger number of users. The application 320 may be configured to collect portions of the content usage pool data 374.

In some implementations, the unwanted edit detector 340 includes, or otherwise makes use of, a machine-trained model 342 to determine if the modification was inadvertent. For example, training data items 380 may be generated based on previous user interactions with the application 320, portions of the user usage data pool 370, and/or portions of the content usage data pool 374, and the training data items 380 user by a model training system 382 to generate a new model 342 for use by the unwanted edit detector 340. In response to the unwanted edit detector 340 determining that the modified state 338 includes an inadvertent modification, an action presentation component 326 causes a user interface element to be presented to the first user 310 to confirm whether the modified state 338 includes an inadvertent modification. A response from the first user 310 is received as an action selection input 334; for example, an input indicating whether the first user 310 selected a first option to discard the modification or a second option. For example, rather than discard the modification, the action selection input 334 may indicate the first user 310 wishes to retain the modification in a second new file 358 including electronic content 360 reflecting the modified state 338, while leaving the first file 354 unchanged.

Figure 4:
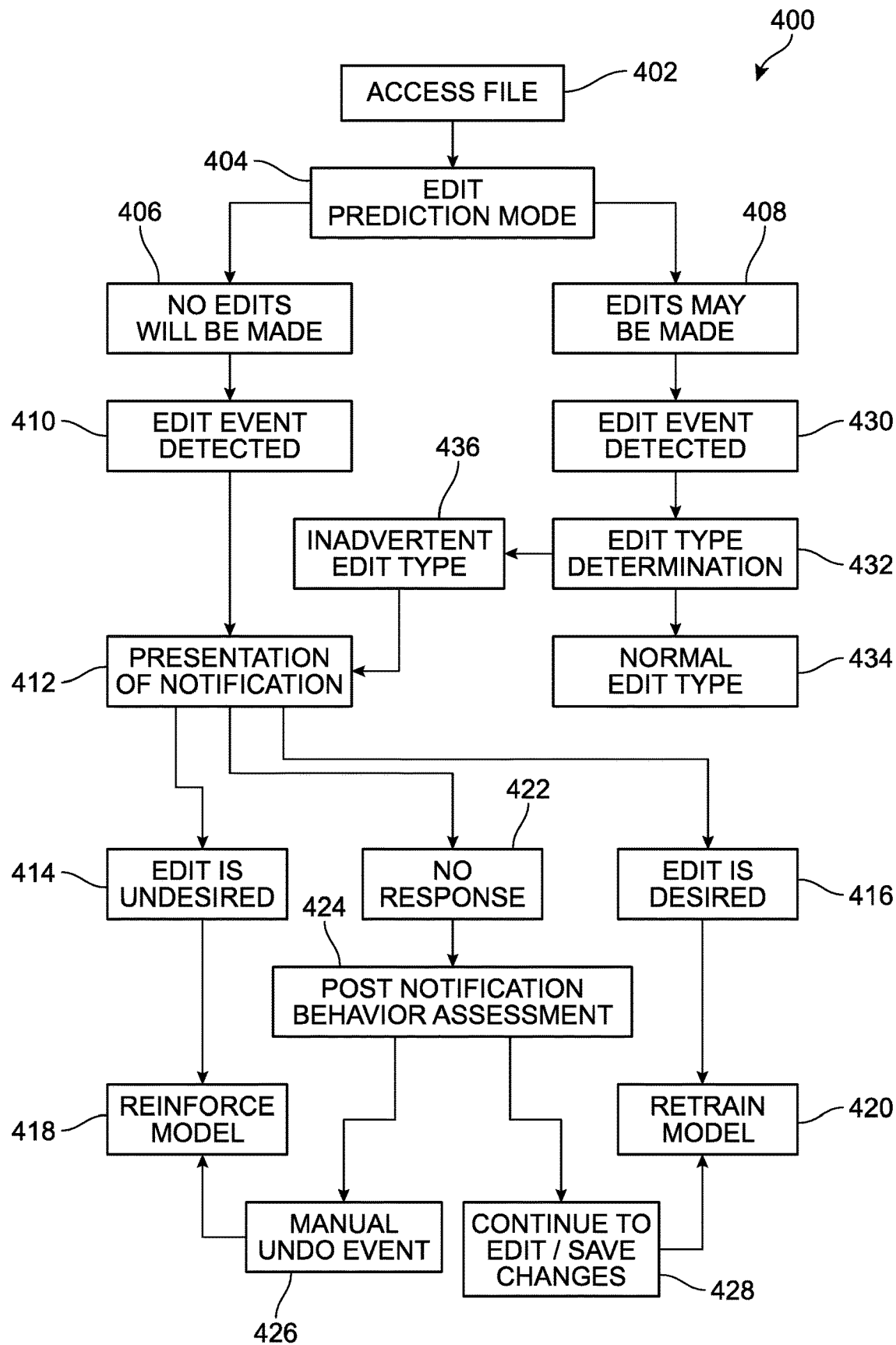
FIG. 4 is a flow diagram illustrating an example of implementing a model for determining an edit's intentionality.

For purpose of clarity, FIG. 4 presents a flow diagram illustrating an implementation of a method 400 of training and implementing an MLA for managing edits to electronic content. As touched upon earlier, in different implementations, the system can be trained using data generated by machine learning models in order to identify, determine, and/or assess the intent associated with an edit. Such data may be generated following the accumulation, review, and/or analysis of a large number of edit-related events or actions that may be configured to provide the MLA with an initial or ongoing training set, including recorded use or behavior of application features by different users over time (content usage history). As a general example, the number of events used to serve as a baseline can range from 100 to over 100,000. In addition, in some implementations, the user device can be configured to transmit data captured locally during use of the relevant application(s) to the cloud or the local ML program and provide supplemental training data that can serve to fine-tune or increase the effectiveness of the MLA. The supplemental data can also be used to facilitate identification of inadvertent edits for a particular (unique) user or class of users and/or to increase the training set for future application versions or updates to the current application.

In different implementations, a training system may be used that includes an initial ML model (which may be referred to as an "ML model training module") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to identify and/or classify device events or user behavior based on data collected during use of the system. In some implementations, machine learning techniques may generate one or more models for identifying and/or characterizing events based on a corpus of training data in the form of labeled or otherwise previously characterized data. In some implementations, one or more portions of the training data may be provided via the device(s) itself. Furthermore, the training data may be continually updated and one or more of the models used by the classification system can be revised or regenerated to reflect the updates to the training data. Over time, the training system (whether stored remotely, locally, or both) can be configured to receive and accumulate more and more device-generated training data items from locally operated assistive devices and/or other training data collection devices, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, a machine learning model can be developed that is configured to predict with high confidence, precision, and recall whether a user is likely to or is currently making an inadvertent edit. The ML model can then provide a user experience that guides the user to recover the original content or pursue other edit management options if the model's prediction was correct. In some implementations, the ML model can obtain reinforcement signals to improve the model and better account for user intentions regarding an edit. As a preliminary modeling paradigm, some implementations can make use of one or more bootstrapping algorithms to provide approximations of these predictions. For example, in one implementation, the model can assume all edits made by a user are intentional as a proxy. In some implementations, the resulting (initial) model of this example can be configured to predict whether a user is likely to make any edits at all when they open a file with 80% or greater precision. In some implementations, if the model determines that the user will not make any edits to the file, the mouse cursor or other input means may not be made readily available or apparent, thereby requiring the user to proactively interact with the application in order to modify the file.

Furthermore, in different implementations, the initial model can serve as a baseline that facilitates the collection of additional and/or more relevant training data, permitting further development and improvement of the model. Generally, the stages of an edit can include opening or otherwise accessing electronic content, clicking or repositioning the location of the cursor (e.g., via a mouse) within the content, entering, deleting, or changing text or any other data in the electronic content, highlighting or selecting a portion of the electronic document, interacting with menu options associated with edits, and/or manipulating the data in any other manner. Each of these aspects can be divided and classified into discrete events that may be identified individually or collectively as a triggering event, which can in some implementations elicit the presentation of a native control, such as a graphical UI, or GUI.

For purposes of this description, a "trigger event" or "triggering event" refers to an event (or specific sequence of events) associated with a particular use of an application, which is then used to trigger the display of a native control in a native application. In some implementations, the triggering event may be understood to include a 'click' or other input actions (such as a mouse left-button or right-button click, a touchscreen tap, a selection of data, or other input types). However, in other implementations, a triggering event may occur in response to results from automated intelligent scans or searches of the document and its various content elements by the system (see FIG. 6). For example, the application can be configured to automatically search the electronic content periodically, substantially continuously, or at intervals determined by an end-user, and identify when an edit to a content element or an insertion or deletion is incongruous in the broader context of the document, and may therefore be inadvertent.

In some implementations, the system may be configured to identify these or other actions as corresponding to a usage type or a specific event. Thus, in one implementation, the system can be configured to determine, for example during use of an application, that a triggering event has occurred based on a detected occurrence of a particular usage history and/or a type of usage for or associated with the electronic content itself (including but not limited to metadata, structured data, and unstructured data). In response to such a determination, the application may present or display a notification. It should be understood that in some implementations, the notification itself may include or serve as a native control, via which the user can select options or respond to system-generated queries (see for example FIGS. 7-9).

In different implementations, the system may also configured to ask or present a query to the user regarding whether an edit determined to be inadvertent was correctly identified. The feedback provided by the user can then reinforce or retrain the model. For example, if the user responds that the determination was correct, the model can be reinforced, and if the user responds that the determination was not correct, the model can be updated or retrained. Furthermore, it can be understood that there will be cases where users will ignore or dismiss any dialog windows or notifications, and no feedback will be provided. In this situation, the user's subsequent actions can nevertheless be informative for training the model. As an example, if the system predicts that a user will not edit a document, and the user then does in fact edit the document, the system will produce or present a notification to the user, and ask if the edit was intentional. The user may ignore or close the notification warning without responding to the query, but then delete the edit that he or she had just made immediately or soon after being shown the notification. Such behavior can indicate to the system that its prediction was correct, which can be used to re-enforce the model. Alternatively, a user may continue to edit the document, indicating that the prediction was incorrect, and this information can be used to retrain the model.

Another example of actions or events that may signal that an edit was inadvertent include the period of time that passed before a user deleted the edit, performed an undo, restored the original content, and/or saved a new version of the document after the native control was presented. In one implementation, if the deletion or undo occurs within 30 seconds of the presentation of the notification, the system may assume the edit was unintentional. In different implementations, the threshold may differ, such as 10 seconds, 20 seconds, one minute, or other durations. In cases where the system did not predict an inadvertent edit, and the user later opts to restore the file to its original version, the model can be updated to minimize false negatives. This data can be collected even if a user opts out of the edit management system functionality to improve the model for later applications.

Referring now to the flow diagram of FIG. 4, it can be seen in one implementation that a first step 402 of this process can include the access or opening of an electronic content or file, which may trigger or initiate an Edit Prediction mode in a second step 404. As described herein, the prediction can be based at least in part on a variety of structured and unstructured data (see FIGS. 5 and 6), including but not limited to usage characteristics by this user, file history and metadata, and/or usage characteristics of other users who have edited the same document, such as a history of users who have saved the document as a new file before editing, reverted changes made to the content, and/or restored the file to its original state after adding an edit.

In the second step 404, the model may determine the likelihood that an edit will occur during the current session. In some cases, the model can determine that no edits are likely to be made to the document (a third step 406), or can instead determine that edits are likely to be made (a fourth step 408). If there is a determination that no edits will be made (third step 406), and an edit is nevertheless detected (a fifth step 410), the application can be configured to automatically display or present a notification window or other user interface (a sixth step 412), alerting the user of the detection of what may be an inadvertent edit. The user can then be prompted to respond, either confirming that the edit was undesired (a seventh step 414) or that the edit was actually intentional (an eighth step 416).

If the user confirms that the edit was unwanted (seventh step 414), the prediction model can be automatically reinforced in a ninth step 418. If however, the user instead indicates that the edit was desired (eighth step 416), the system can use the feedback to help in retraining the model (a tenth step 420). In cases where the user makes no response or otherwise ignores the notification (see an eleventh step 422), the system can automatically collect or record data regarding user behavior subsequent to the notification in a twelfth step 424. As one example, the user may manually undo the edit (a thirteenth step 426), delete the edit, save a new copy of the file, restore the original file, or engage in other such actions which can indicate to the system that the model's prediction or assessment was correct (ninth step 418). Other examples of such behavior are described further below. In cases where the user retains the edit and/or continues to make changes (a fourteenth step 428), indicating that the edit was intentional, the system can employ this information to retrain the model (tenth step 420).

Returning to the top of the diagram, in some cases there may instead be a determination that edits may indeed occur during use of this file (fourth step 408). If an edit is detected (a fifteenth step 430) in such a context, the application can automatically review or assess the specific edit, and attempt to determine the type of edit that has been made (a sixteenth step 432). If the edit is determined to be 'normal' or is an expected edit type, the system can remain dormant (i.e., no notifications are presented), as represented by a seventeenth step 434. If on the other hand the edit includes features or aspects that suggest a likelihood that the change was inadvertent or otherwise unexpected (an eighteenth step 436), the inadvertent edit alert process can be triggered automatically, as described above (see sixth step 412 through fourteenth step 428 described above). For example, if the edit that was made appears out of context, or is associated with grammatical errors, the edit may be inadvertent.

As referenced herein, the term "automatically" or "automatic" are defined as not requiring user intervention, notification, or involvement. Thus, user assistance is not required for the process or task to occur. As another example, the term "automatic" refers to a function, a process, a method, or any part thereof, which is executed by computer software upon occurrence of an event or a condition without intervention by a user.

In different implementations, the features or specific data types harvested by the system to assess the likelihood or intentionality of an edit can vary depending on the user, the user class, the device, the application, the document type, the purpose of the document, how the document is being saved or accessed, the device location, or other factors. However, as a general matter, the preliminary model can be trained by instances or data associated with a plurality of structured or unstructured data that have been found to be predictive for edit management, which can comprise the content usage history for an electronic content. Some examples of these data features are presented below with reference to FIGS. 5 and 6. However, it should be understood that this list is provided for purposes of example only, and the system may additionally or alternatively refer to a wide variety of data features that are not listed in FIGS. 5 and 6 to help determine whether an edit is inadvertent or if an edit is likely to occur.

Referring first to FIG. 5, some example features of structured data that may be collected or obtained by the system to predict whether an edit is likely to be made, and/or to determine whether an edit that has been made was intentional are listed. For purposes of this description, structured data refers to information with a high degree of organization, such that inclusion in a relational database is seamless and readily searchable by simple, straightforward search engine algorithms or other search operations. Structured data may be organized by specific headings and labels and/or that are easily interpretable by a computer system. For example, structured data may include a data classified by fields, codes, or is stored in a relational-type structure. Structured data is usually readily located, interpreted, and relatable to other data. It may include any type of data, such as text (e.g., a person's name) or numerical values (a person's age), and/or can include the information that relates one piece of data to another (e.g., the age 38 is for the person who is named Alice).

In contrast, unstructured data includes data that may be freeform or generally associated to a broader heading or data field, such as natural language electronic content, including but not limited to notes, emails, word documents, images, sound files, and other such electronic content. Such data may also include hard-copy information that was scanned into electronic form, or data that may have been classified but cannot be understood or evaluated by the current application. In many cases, the unstructured data carries no tags (metadata about the data) and has no established schema, ontology, glossary, or consistent organization.

The table of FIG. 5 lists some examples of structured data that can be collected or referenced by an MLA to assess the likelihood or intentionality of an edit. In some implementations, these types of data can comprise "usage characteristics" and/or may be understood to at least partly convey or represent a usage history for a user or for a specific file. Thus, the usage history may be obtained based on an aggregation of various parameters or characteristics. It should be understood that reference to the phrase "usage history" includes any system-wide activity associated with a user and/or file that has occurred prior to the detection of the triggering event. Thus, the usage history can be recorded, logged, captured, measured, and/or monitored over hours, days, months, or years, as well as only minutes or seconds prior to and including the triggering event.

In different implementations, both content usage history and user usage history can be determined and/or based on an array of variables or events, including both a context of use and a state of use. For example, a context of use can be determined based on internal and external variables including the physical environment where a device is used or biological data associated with a person who uses the device. Similarly, a state of use of the computing system or content can be determined based on the state (or status) of one or more components of the computing system (such as the state of one or more active applications that are being used by person). In some cases, the state of use can be linked to the context of use and help define an event in which the state of use has occurred. This can provide a more accurate determination of the usage history. Furthermore, the state of use can be broad in scope (e.g., is the application active or not) or it can be defined using a relatively complex set of variables to include additional information pertaining to the usage and/or the manner of usage (e.g., information pertaining to the use of one or more applications, as such, for example, how long an application has been open and what files it has opened, what feature has been selected or viewed, the duration of each session, input/output connected with an application, and other such data). This and other types of data can allow more intelligent decisions to occur with respect to the implementations described herein. For example, as noted above, a usage history can be the basis for predicting future actions or use of a computing system by a user.

In FIG. 5, a first example is a "HoursSinceLastEditedByUser" 510 parameter, which indicates how many hours (or other time period) have passed since a particular file was edited by the user (user usage history). In some cases, the information can be limited to a specific window of time, such as the hours since the file was edited over the past three days (or any other number of days). Another example is a "FileExtensionGroup" 520 parameter, which indicates what type of file is being edited or accessed. The "HoursSinceLastEdit" 530 parameter refers to how many hours have passed since the file was last edited (by any user, content usage history); this parameter can also be identified for a specified period of time. In addition, "NumTimesDocEdited" 540 parameter indicates the number of times the document was edited by one or more users over a period of time (content usage history). A "NumWXPDocumentRead" 550 parameter refers to the number of Word, Excel, or Powerpoint (or other plurality of specific file types) format files that were accessed over a period of time (user usage history). While Microsoft® file extension types are listed here for purposes of illustration, these file types can encompass any file type for the broad range of software applications available used in the development or editing of electronic content. The "NumExcelDocumentRead" 560 parameter refers to the number of Excel (or other specific file type) format files that were accessed over a period of time (user usage history). The "NumTimesDocEditedByUserInWeek" 570 parameter indicates the number of times a particular document has been accessed over the past seven days (content usage history). In addition, the "HoursSinceLastOpenByUser" 580 parameter indicates the number of hours since the user has opened any files (user usage history). It should be understood that the names and specific features of each parameter shown in FIG. 5 and described herein can differ from those presented here. Furthermore, these parameters are shown for illustrative purposes only, and should by no means be understood to limit the types of data that may be collected for use by the proposed system.

Some other examples not listed include identifiers associated with social media such as (a) time since last @mention (this user) or (b) time since last comment (this user). In addition, features such as (c) the period of time since creation of the file; (d) whether the file was shared with or created by the user; (e) whether the user has ever opened this file (e.g., most recently opened); (0 hierarchy or position of the person who shared the file with the user (e.g., a supervisor, colleague, friend, employee); (g) how often this file has been opened as read-only or was only read and not modified by the current user and/or by other users; (h) how often this file has been opened and modified by the current user and/or by other users; and (i) how many other users have opened the file and modified the file (or retained the file in its original form). In other implementations, the system may utilize feature clustering, where one event or behavior can indicate further actions are more or less likely. For example, if a first action involved the insertion of a comment, it may be highly predictive of a second action, such as an intended edit. Similarly, more tangible factors, such as the device type that is being used to access the document (e.g., a tablet, mobile device, desktop computer, etc.), and/or how the document is being accessed (e.g., via a desktop application, a web application, through an email attachment, etc.).

In different implementations, other types of data can be collected or obtained by the system to determine the likelihood or intentionality of an edit. For example, as noted above, the system can be configured to collect various unstructured electronic content that to assist the model in its assessment. The table of FIG. 6 illustrates one non-limiting example of such data. In this example, a series of content elements 600 is presented, including a first content element 610, a second content element 620, a third content element 630, a fourth content element 640, a fifth content element 650, and a sixth content element 660. The content elements 600 in this case are sentences comprising a text document. In some implementations, the system can be configured to determine the general topic or class 670 a content element (here, a sentence) may be associated with. In one implementation, the system may also include a secondary theme or subclass 680 for the content element.

In the example shown in FIG. 6, it can be seen that the first content element 610, the second content element 620, the third content element 630, the fifth content element 650, and the sixth content element 660 have been determined to relate or refer to a first category, here labeled as weather. However, the fourth content element 640 has been identified as being associated with a second, different category (here labeled as animals). In addition, the system can determine that the fourth content element 640 was more recently inserted into the text relative to the other content elements (i.e., the fourth content element 640 is an edit to previously drafted text). In some implementations, the system may review this information and determine that the likelihood of the fourth content element 640 being an inadvertent edit to this particular text document is sufficiently great that a notification should be provided to the user to alert them.

Figure 7:
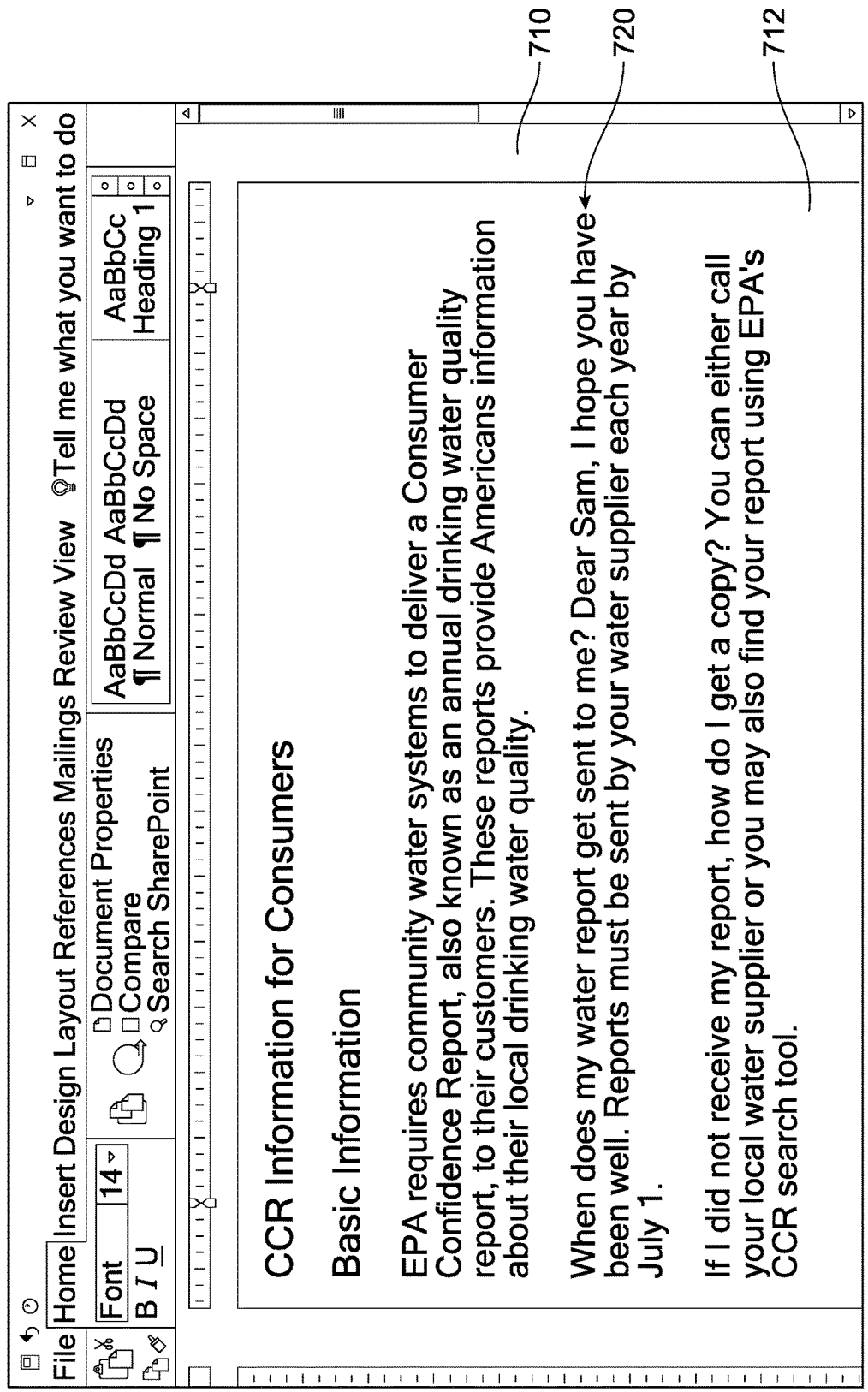
FIG. 7 is a display diagram illustrating an implementation of a document with edited content.
Figure 8:
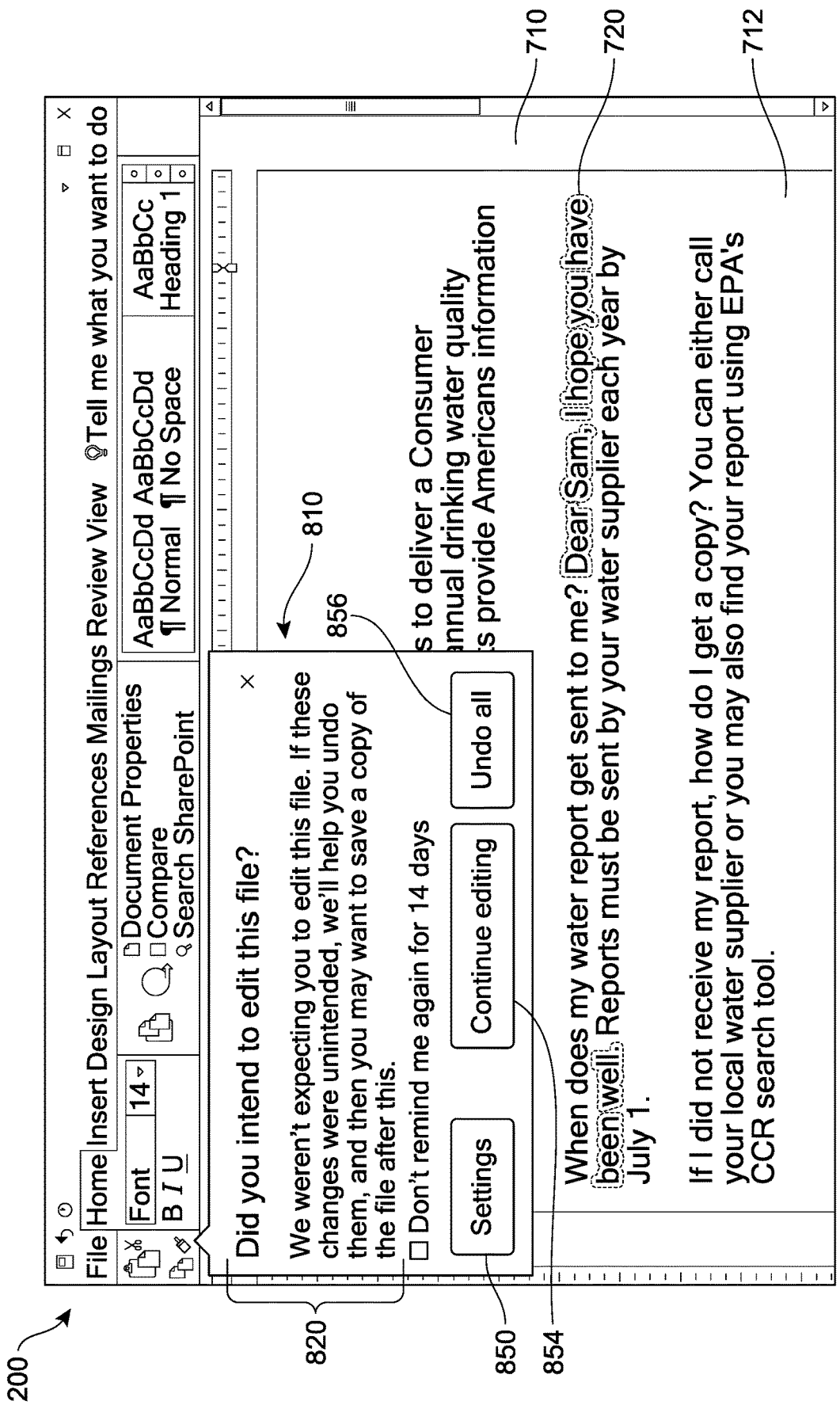
FIG. 8 is a display diagram illustrating an implementation of the document of FIG. 7 where the edited content is associated with a triggering event.

Referring now to the sequence of FIGS. 7-9, one implementation of the proposed system is illustrated. In FIG. 7, the display 200 presents an interface for a second application 710. For purposes of simplicity, the second application 710 in FIG. 7 is a word processor program, and a user has opened or otherwise accessed an electronic content 712 associated with the second application 710. In other implementations, the second application 710 may include any other software applications within the Microsoft Office Suite® or array of Microsoft® products as well as any non-Microsoft® based applications.

During various user interactions with the second application 710, a user may scroll through or otherwise interact with electronic content 712. As one example, the system can predict—based on factors including but not limited to this user's previous recorded usage with respect to this particular electronic content 712 and access-type or permissions for other users of this document, and other features described above with respect to FIGS. 5 and 6—that the document has a high likelihood of being read-only (RO) file, and a correspondingly low likelihood of being edited. If the user then begins to input text or make any edits, the system can interpret such action as being associated with a triggering event. The determination can be associated with a read-only probability threshold value assigned to the user or file. The threshold can be lowered if a user wishes the system to be more sensitive to possible inadvertent edits, or increased if a user wishes the system to be more selective as to the types of edits that might trigger a notification. As the user begins to input new text (see an inserted content element 720), the system can immediately or very soon after the insertion or edit automatically present a native control to the user (see FIG. 8), alerting the user that this may be an inadvertent edit.

As a second, alternate example, if the system had instead predicted that the document has a low likelihood of being read-only (RO) file, and a correspondingly high likelihood of being edited, as the user begins to input text or make any edits, the system can interpret such action as being normal and no action is taken. As the user begins to input new text (see the inserted content element 720), the edit management functions may remain dormant. However, as discussed above, in some implementations, the system may continue to automatically collect structured and/or unstructured data to determine if any of the edits being made in this case are nonetheless unintentional. In FIG. 7, the text of the inserted content element 720 includes "Dear Sam, I hope you have been well." In reviewing the unstructured data of this file—in this case, the actual text of the word document—the system can be configured to assess the subject or type of the edit (see FIG. 6). In analyzing the broader context surrounding the edit, the system may determine that the edit was incongruous with the surrounding text. In FIG. 7, the system identifies the inserted content element 720 as indicating the beginning of a letter, and the broader context as being associated with water supply management.

Referring to FIG. 8, in some implementations, the system can then use this information to determine that the edit has a high likelihood of being inadvertent and interpret the insertion of this particular text as being associated with a triggering event. In this case, in response to the triggering event, the system displays a native control in the form of a first GUI 810, providing a notification 820 and a plurality of options related to the management of the edit. While the native control (first GUI 810) presented is shown here as a floating dialog window, in other implementations, the native control can include any other type of user interface such as a pop-up window, a floating menu, a dialog box or callout, a window or drop-down extending from a main menu, or other application communication or presentation means. Furthermore, in FIG. 8, the first GUI 810 is overlaid on the second application's main interface. The specific location of the first GUI 810 represented in FIG. 8 is intended to underscore the relationship of the message of the first GUI 810 with the electronic content 712. However, it should be understood that in other implementations, the first GUI 810 may be displayed or generated anywhere else on the screen(s) associated with the client's system, including spaced apart from, adjacent to, or around the second application 710. In one implementation, the GUI may extend directly from the application's own Edit menu, such that the menu option associated with Undo is directly adjacent or proximate to the GUI, or the GUI is superimposed on a region of the main application menu that includes Edit options.

In different implementations, the period of time between the occurrence of the edit to the presentation of the notification may vary and/or be configurable by the user. In some cases, the default setting may be five seconds, permitting the user time to catch or notice the issue without system intervention, and/or giving the system sufficient time to collect information upon which to perform its assessment and make its determination. In other implementations, the notification can be presented over any period ranging from less than one second to one minute or more. In addition, in some implementations, the system can be configured to present a notification that the edit may be inadvertent only once per session. In other words, if a system determines an edit is inadvertent and informs the user of this determination, subsequent edits during the same session will no longer trigger the presentation of a notification. Furthermore, in one implementation, the system will not display notifications if the file is new (i.e., access of this electronic content is the result of a "Save As"), or if the file was opened or labeled as Read-Only or Final, but then proactively switched to a Read-Write mode by the user and/or the user manually selected an option associated with the application's Edit menu.

As shown in FIG. 8, the notification 820 also includes a query by the system to the user, asking if they intended to edit this file. In some implementations, the notification 820 can include further clarifying information, or other consumer-friendly messaging, as shown in FIG. 8. However, it should be understood that the GUI shown in FIG. 8 is for illustrative purposes only, and by no means limits the type of information or wording that may be presented to a user. Furthermore, in some cases, the GUI may be a more passive alert, simply informing the user that there may be an inadvertent edit in the document, without any further query or options shown.

The first GUI 810 also includes a first option 852 ("Settings"), a second option 854 ("Continue Editing"), a third option 856 ("Undo All"). In other implementations, there may be fewer or greater number of options, and/or the options made available may differ from those shown here. In other implementations, any other alphanumeric text or graphics may be displayed in conjunction with the menu. In different implementations, each option type can be associated with a variety of actions. For example, the Settings option (first option 852) may offer users the opportunity to adjust the display, content, format, communication, access, and other settings associated with the edit management tools. The Settings option can also be configured to allow users to add or modify the available options or policies, create or delete specific notification messages, modify current notifications, change the default management paradigm, as well as select or upload different graphical icons to represent the display alongside or in lieu of the notifications. It should be understood that a Settings option may be made available on some or all of the GUIs, whether or not explicitly identified, or the Settings option may be accessible via an option in the application's main menu.

Furthermore, in different implementations, any of the menus or native controls and options described herein can also include or be associated with an optional tool overview or Help tool. Such options can be configured to provide an introduction or summary of the offered feature(s) or tool(s), including but not limited to presentation of a teaching guide, FAQs, search for help topics, images, schematics, tutorial overviews, screenshots, photos, slideshow, video, audio, and other such content or guidance.

The Continue Editing option (second option 854) can be configured to allow the user to dismiss a notification, as well as provide the system with direct user feedback that can be used to improve the model. Similarly, a user can select the "x" (close window) button to dismiss the GUI. However, as noted above, if a user clicks the second option 854 or otherwise dismisses the notification, but then manually deletes the edit, restores the original content, makes the undo manually, and/or saves a new copy of the file, the system may interpret the action as reinforcement of the prediction model, despite the selected option. In different implementations, the manual deletion or reversion of the modification is limited to the particular modification that triggered the notification. In other words, if the user deletes a large bulk of the electronic content that also includes the detected edit, the system can be configured to determine that the edit was nevertheless intentional.

The Undo All option (third option 856) can be configured to dismiss the notification as well as provide users with a mechanism of quickly removing the edit identified as inadvertent, and/or to empty the Undo stack. In some implementations, the edit identified by the system may be highlighted, underlined, redlined, or otherwise distinguished within the electronic content to ensure a user is aware of the location and content of the target edit. Furthermore, selection of the third option 856 can provide the system with direct feedback that can be used to improve the model. In some other implementations, the GUI can include additional customizable options, such as a fourth option 858, which if checked can be configured to instruct the edit management system to enter a 'silent' mode whereby all notifications are blocked or turned off for a specific device or user account or for a specific file or file type. The user may adjust the settings to configure the period of time the system should remain silent. However, it should be understood that the user may reactivate the notifications at any time.

In some implementations, if the notification appears but is ignored or not in focus in the application, the system can remove the notification after a period of time that can be configured by the user. This period of time can be zero seconds, or can be infinite, meaning the notification remains throughout the entire length of the session. In one implementation, if the notification appears and remains in focus in the application, the system may maintain the presentation of the notification until the user selects one of the options or dismisses the window.

Figure 9A:
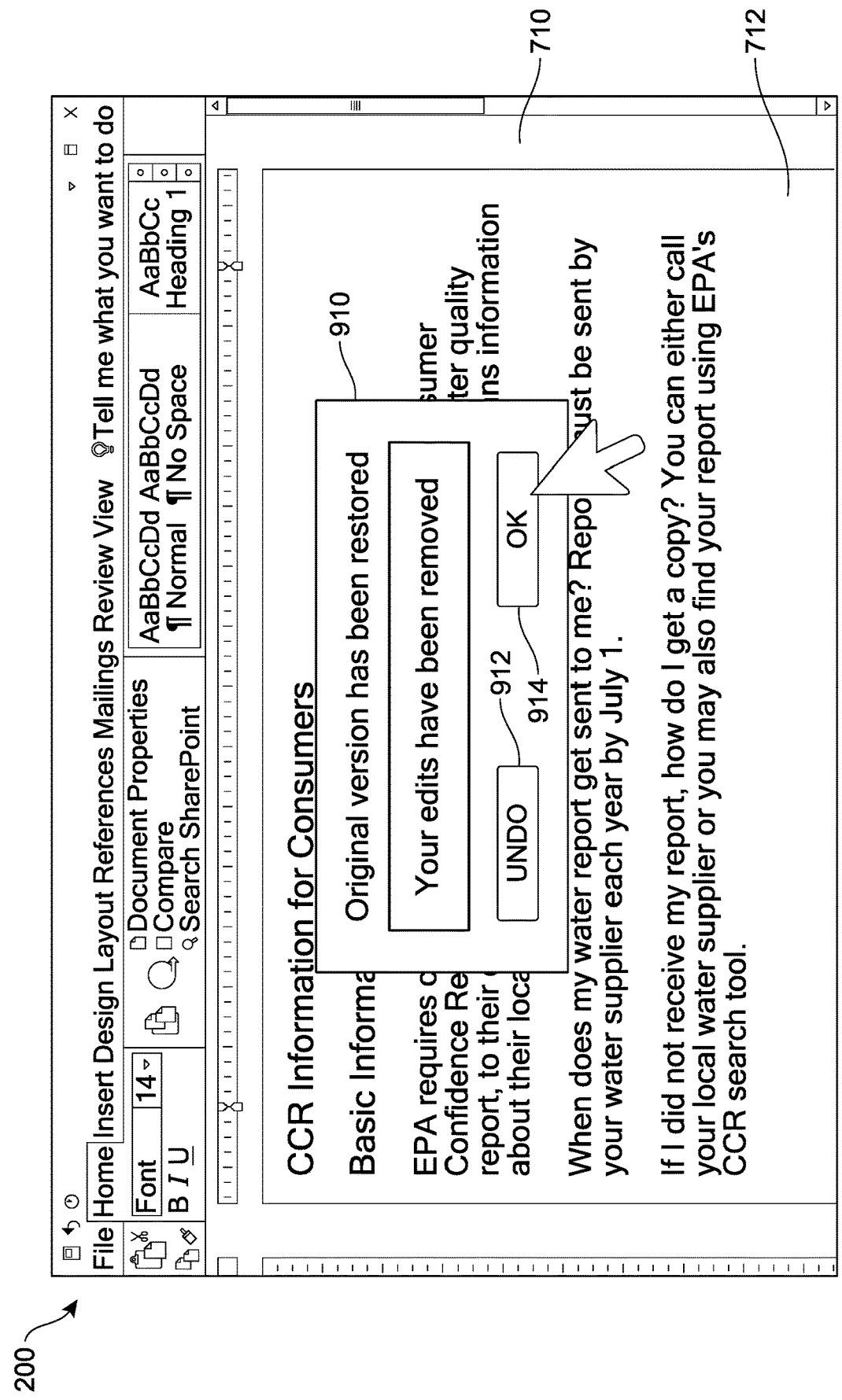
FIGS. 9A-9C are examples of responses to a triggering event.
Figure 9B:
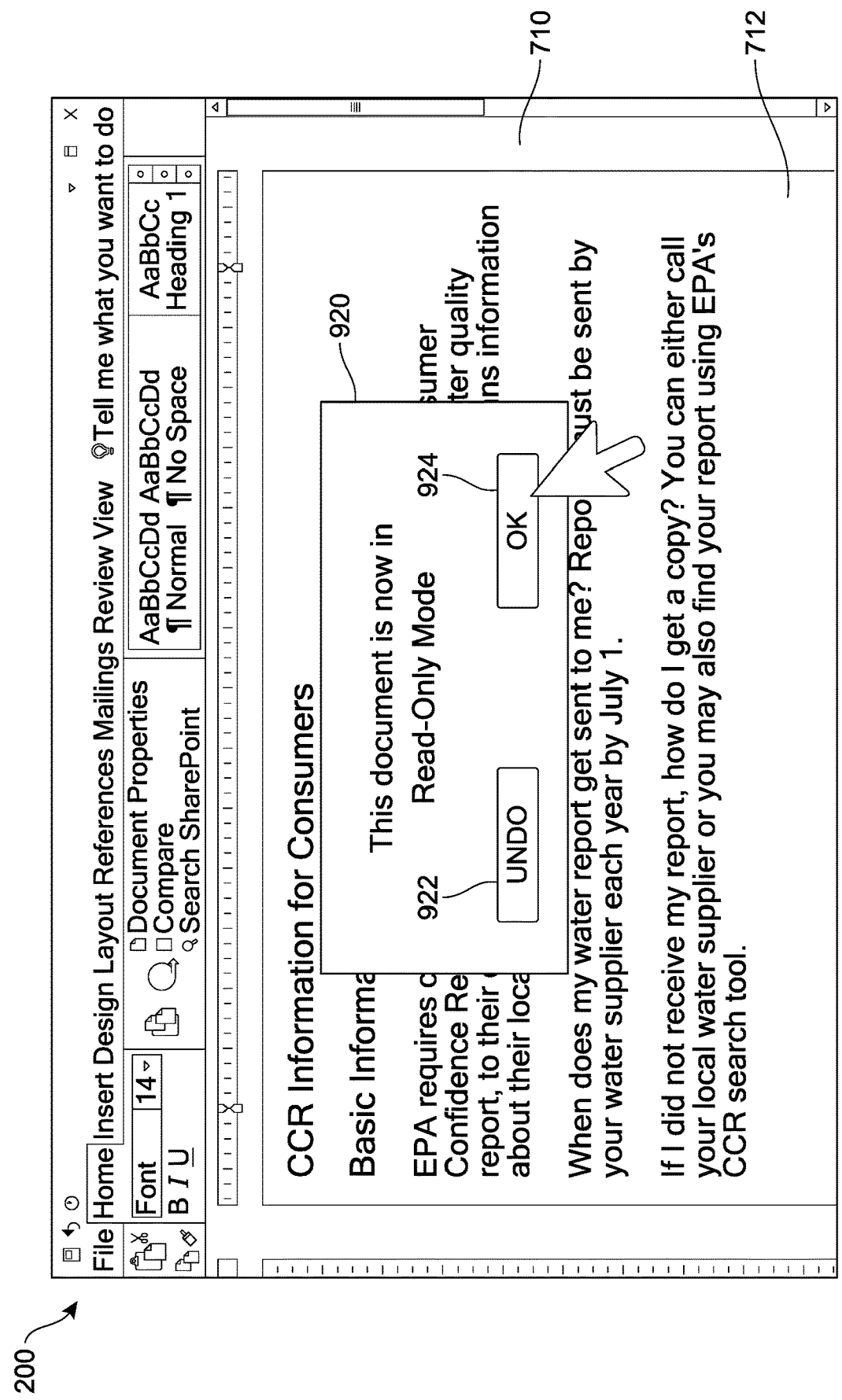
Figure 9C:
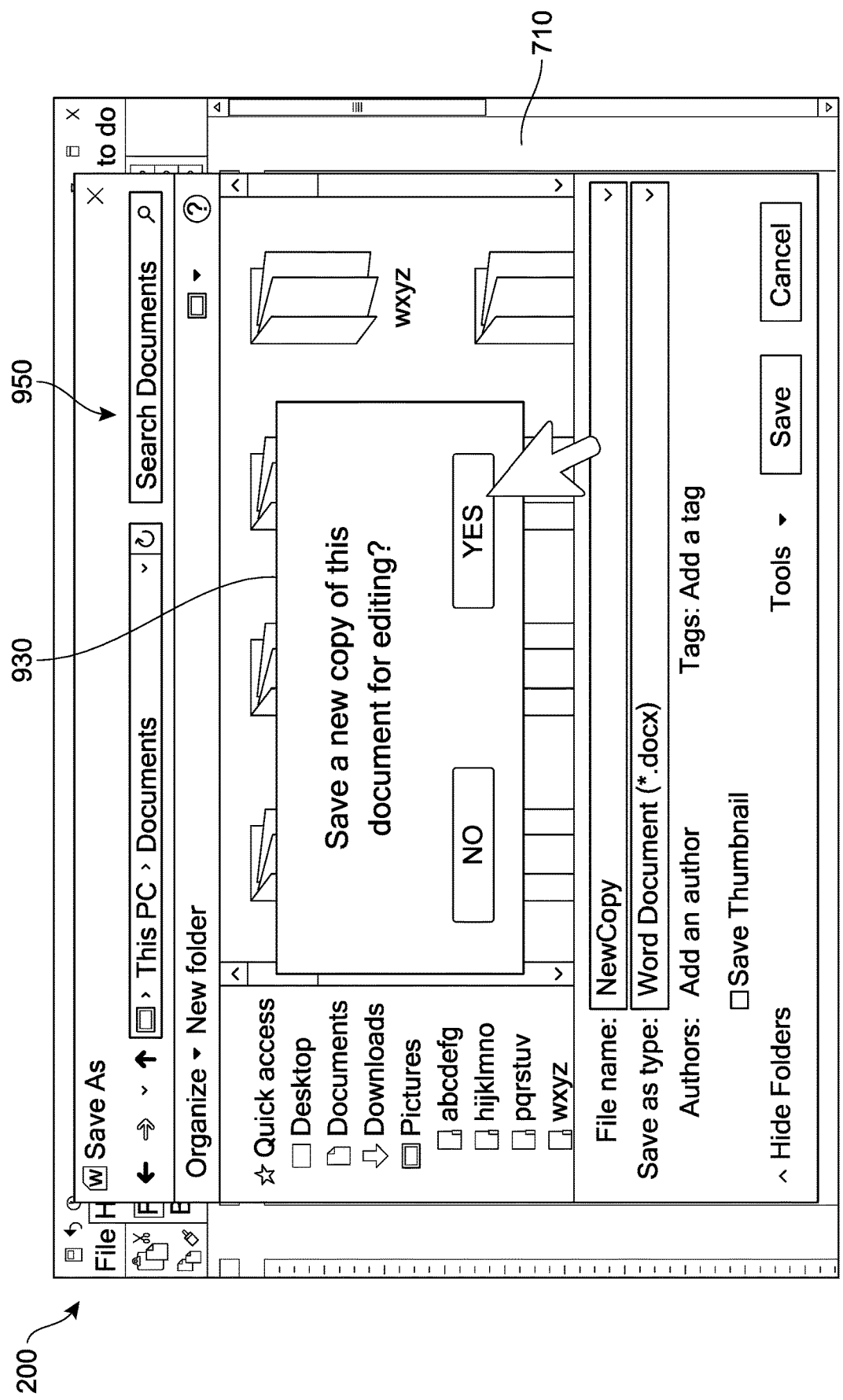

Some general examples of system responses to the selection of the third option 856 are depicted in FIGS. 9A, 9B, and 9C. It should be understood that these are presented for illustrative purposes only, and other responses can occur within the scope of this disclosure. Furthermore, though these examples are shown as separate events for purposes of clarity, the system can initiate a combination of two or more responses in some implementations. Referring first to FIG. 9A, the user is informed via a second GUI 910 that the edits made to the file in this session have been removed and the original content restored. A first option 912 allows a user to "undo the undo" or change their previous selection and return the edits to the document (as well as dismiss the second GUI 910), while a second option 914 simply acknowledges the notification and/or dismisses the second GUI 910. Similarly, in FIG. 9B, the user is informed via a third GUI 920 that access to the electronic content or file has been reduced. For example, in one implementation, the first user can be shifted from access associated with Read-Write permissions to access associated with Read-Only permissions. In FIG. 9B, the first user has been locked or assigned a Read-Only mode, such that the first user will be unable to make modifications to the content. A first option 922 allows a user to undo the mode restriction (as well as dismiss the third GUI 920), and a second option 924 accepts the restriction and/or dismisses the third GUI 920. In addition, in FIG. 9C, the user is provided an opportunity via a fourth GUI 930 to save a new copy of the file and allow the user to make changes without affecting the original content. In some implementations, the system can also automatically present a dialog window 950 that allows the user to save the new copy.

Figure 10:
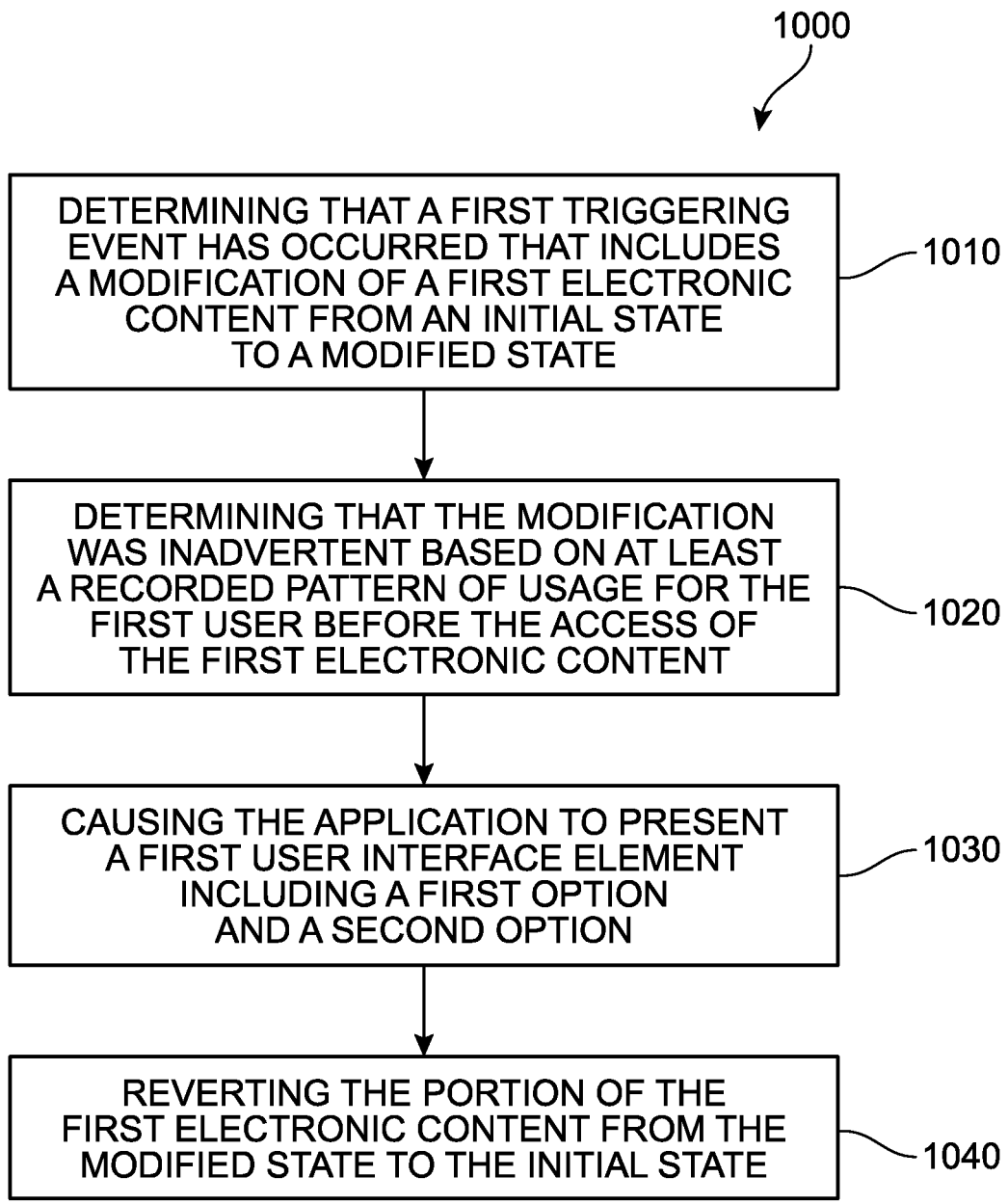
FIG. 10 is a flow diagram illustrating an implementation of a process for managing edits.

For purpose of clarity, FIG. 10 presents a flow chart illustrating an implementation of a method 1000 of preventing inadvertent edits to electronic content. In the example of FIG. 10, a first step 1010 includes determining, for example during use of an application, that a first triggering event has occurred during access of a first electronic content. In some implementations, the first triggering event includes a modification of a portion of the first electronic content by a first user such that the electronic content changes from an initial state to a modified state. In other implementations, the first triggering event can be associated with a usage history for the electronic content itself. A second step 1020 includes determining, in response to the first triggering event, that the modification was inadvertent based on at least a recorded usage or access of the electronic content by the first user before the access of the first electronic content and/or usage history associated with the electronic content itself (including but not limited to metadata, structured data, and unstructured data, types of use and access by other users). In a third step 1030, the method includes causing, in response to the determination that the modification was inadvertent, the application to present a first user interface element. The first user interface element can include a first option and a second option. A fourth step 1040 includes reverting, in response to receiving a first user input indicating a selection of the first option, the portion of the first electronic content from the modified state to the initial state.

In other implementations, additional steps may be included. For example, in some implementations, the method can further include automatically reducing access of the first user to the first electronic content from a read-write access to a read-only access in response to receiving the first user input. In another example, the first user interface element can be presented after a delay of at least two seconds following the modification of the portion of the first electronic content. In other implementations, the determination that the modification is inadvertent is further based on a determination that the modification includes a text-based typographical error. In some cases, the determination that the modification is inadvertent is further based on a prediction, made prior to the modification, that the accessed first electronic content would not be modified by the first user. As one example, the first user interface element can include a notification informing the first user that their most recent modification may include an inadvertent edit. In some implementations, the method can also include detecting a period of inactivity by the first user following the first triggering event, where the causing the application to present a first user interface element is performed in response to the detection of the first period of inactivity and the determination that the modification was inadvertent. In other implementations, the method can further involve determining, such as during use of the application, that a second triggering event has occurred during access of a first file. In addition, the second triggering event may include a modification of a portion of the first file by a second user from an initial state to a modified state. The method can also include determining, in response to the second triggering event, that the modification was inadvertent based on at least a recorded usage history for the second user before the access of the first file and/or a usage history for or associated with the electronic content itself (including but not limited to metadata, structured data, and unstructured data), and causing, in response to the determination that the modification was inadvertent, the application to present a second user interface element including a third option to record the modified state as a second file. Additional steps may include receiving a second user input indicating a selection of the third option, creating, in response to receiving the second user input, a new file including the modified state of the first file, and maintaining, in response to receiving the second user input, the first file in its initial state.

In different implementations, other steps can be included. For example, the method may include receiving a signal that a file has been opened or accessed by a user. In addition, the method can involve predicting whether the file is likely to be edited. In cases where an edit to the file occurs, the method can include determining whether the edit is inadvertent or intentional, and if it is determined to be an inadvertent edit, notifying the user and/or providing options for addressing the issue. In some implementations where the electronic content is being accessed through a network or the cloud, the sharing of the edit with other users can be delayed until the intentionality of the edit is confirmed or a specified period has passed. Other steps and features described herein may also be included in the method in different implementations, and in some implementations, certain steps may be omitted.

In some implementations, there may be other methods that can be used to prevent inadvertent edits to electronic content. As an alternate example, a first step can include a determination of a first usage history associated with a first electronic content, followed by a second step of determining, by applying a first machine learning algorithm to the first usage history, that the first electronic content is associated with a low likelihood of being modified by a first user. A third step can include detecting a modification of the first electronic content by the first user, and a fourth step may include determining, upon detection of the modification of the first electronic content, that the modification was inadvertent (based on the determination that the first electronic content is associated with the low likelihood of being modified by the first user). A fifth step may include causing, in response to the determination that the modification was inadvertent, a first user interface element including a first option and a second option to be presented to the first user. A sixth step may involve reverting, in response to receiving a first user input indicating a selection of the first option, the modification to the first electronic content.

In other implementations, the method may also involve creating, in response to receiving the first user input indicating a selection of the first option, a new training data sample based on at least the first usage history and indicating the modification was unintentional, and adding, at a first time, the new training data sample to a training data set. The first machine learning algorithm can then be updated at a second time after the first time and using the training data set.

In another implementation, the method involves creation, in response to receiving a second user input indicating a selection of the second option, of a first training data sample based on at least the first usage history and indicating the modification was intended by the first user, and adding of the first training data sample to a training data set at a first time. The first machine learning algorithm can then be updated at a second time after the first time and using the training data set. In cases where the system detects a reversion, by the first user, of the modification, the method can also include removing, in response to the detection of the reversion, the first training data sample from the training data set, before the second time. A second training data sample can be created in response to the detection of the reversion, based on at least the first usage history and indicating the modification was unintentional, and the second training data sample can be added to the training data set before the second time.

As noted previously, the ability to provide one or more users a mechanism by which to manage inadvertent edits of electronic content can significantly improve workflow efficiency. In addition, by enabling specific actions or access modes based on user input, users are provided an opportunity to increase the accuracy and consistency of their workflow. This type of management model can help a user feel more comfortable in the development and use of their electronic content, and/or reduce the possibility of other users causing accidental or unintentional errors in a document.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
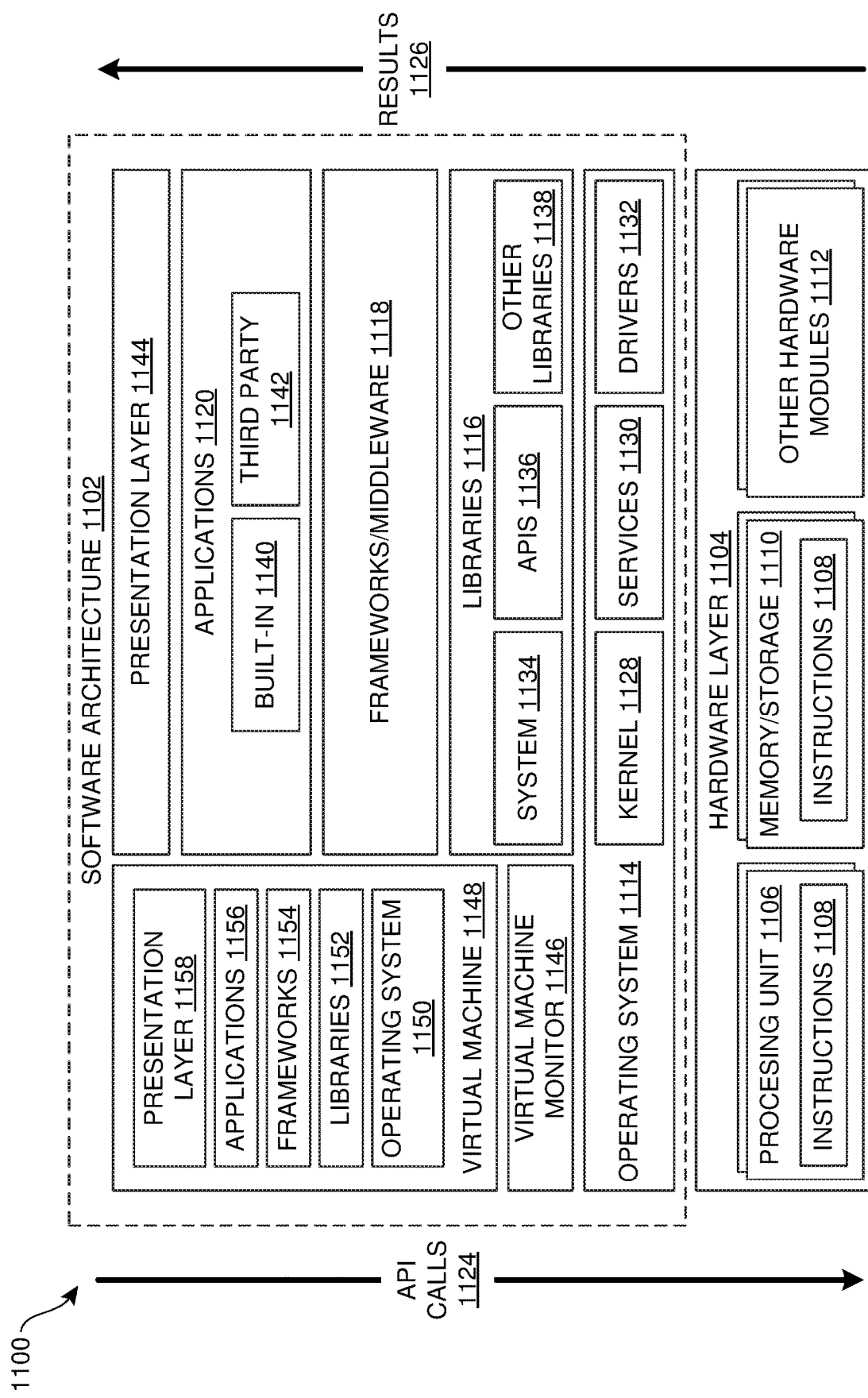
FIG. 11 is a block diagram of an example computing device, which may be used to provide implementations of the mechanisms described herein.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a device 120 of FIG. 1 that includes, among other things, document storage 1070, processors, memory, and input/output (I/O) components. A representative hardware layer 1104 is illustrated and can represent, for example, the device 120 of FIG. 1. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1000 of FIG. 10, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
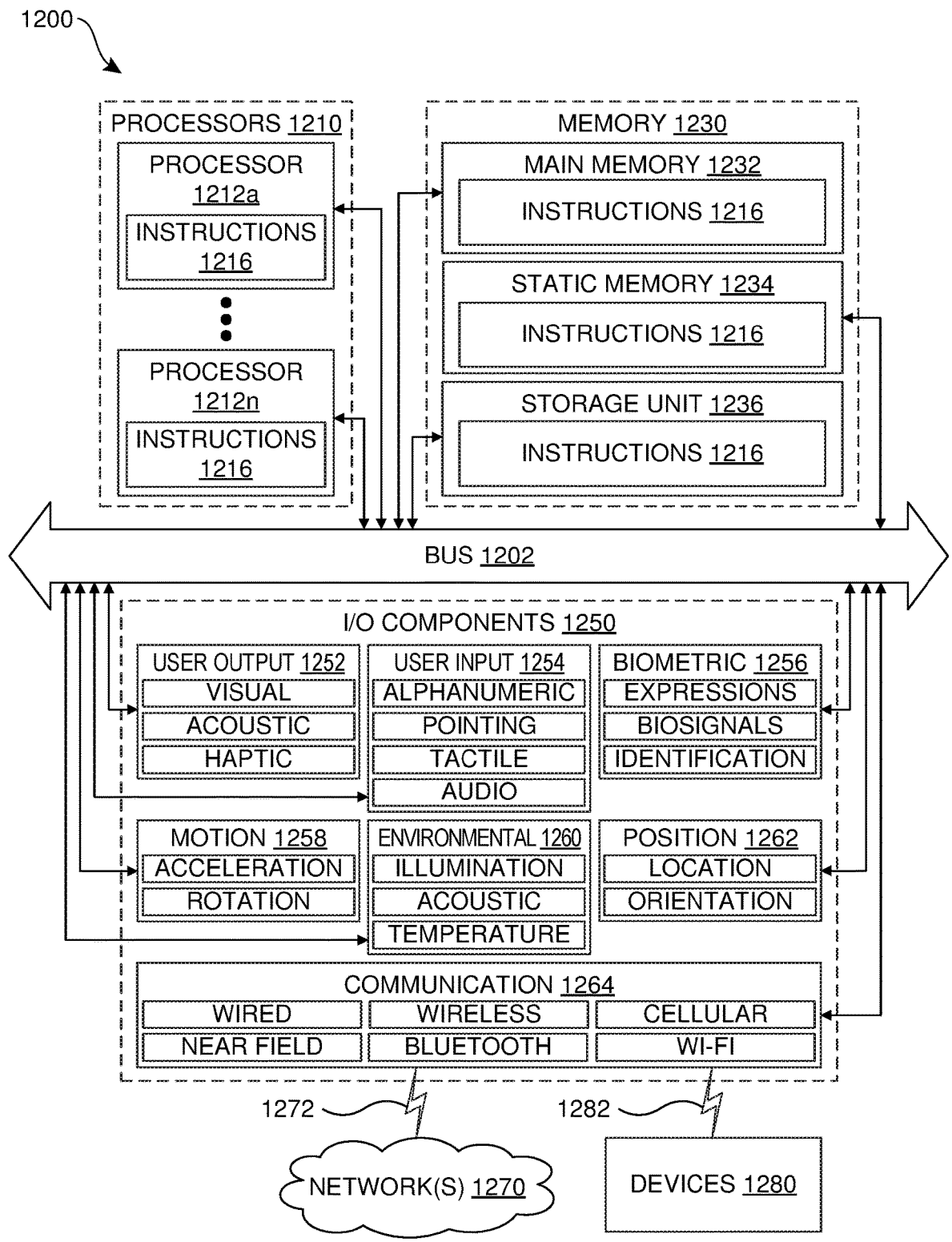
FIG. 12 is a block diagram illustrating components of an example machine configured to read instructions from a machine-readable medium.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212*a* to 1212*n* that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 8,660,978 to Hinckley et al., issued Feb. 25, 2014 and titled "Detecting and Responding to Unintentional Contact with a Computing Device," the disclosure of which is herein incorporated by reference in its entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A device comprising:
one or more processors; and
one or more computer readable media including instructions which, when executed by the one or more processors, cause the one or more processors to:
  determine a prediction using a machine learning model trained to predict whether a first user will modify a first electronic content based on a usage history for the first user, a usage history for the first electronic content, or both, that the first user will not modify the first electronic content;
  determine that a first triggering event has occurred during access of the first electronic content, the first triggering event including a modification of a portion of the first electronic content by a first user from an initial state to a modified state;
  determine, in response to the first triggering event, that the modification was inadvertent based on the prediction;
  cause, in response to the determination that the modification was inadvertent, a first user interface element including a first option and a second option to be presented to the first user, the first option confirming that the modification was inadvertent and the second option confirming that the modification was intentional; and
  present guidance to the user using the machine learning model, the guidance identifying the modification made to the first portion of the first electronic content and steps for recovering the portion of the first electronic content from the modified state to the initial state responsive to receiving a first user input indicating a selection of the first option.

2. The device of claim 1, wherein the instructions further cause the one or more processors to automatically reduce access of the first user to the first electronic content from a read-write access to a read-only access in response to receiving the first user input.

3. The device of claim 1, wherein the determination that the modification is inadvertent is further based on a determination that the modification includes a text-based typographical error.

4. The device of claim 1, wherein the determination that the modification is inadvertent is further based on a prediction, made prior to the modification, based on at least the usage history for the first user or usage history for the first electronic content, that the accessed first electronic content will not be modified by the first user.

5. The device of claim 1, wherein the instructions further cause the one or more processors to:
cause, in response to the determination that the modification was inadvertent, present a second user interface element including a third option and a fourth option;
create, in response to receiving a second user input indicating a selection of the third option, a new file including the modified state of the first electronic content; and
maintain, in response to receiving the second user input, the first file in its initial state.

6. A device comprising:
one or more processors; and
one or more computer readable media including instructions which, when executed by the one or more processors, cause the one or more processors to:
determine a first usage history associated with a first electronic content;
determine in response to the first electronic content being accessed by a first user, by applying a first machine learning model trained to predict whether a first user will modify the first electronic content to the first usage history to generate a prediction that the first user will not modify the first electronic content;
detect a modification of the first electronic content by the first user;
determine, upon detection of the modification of the first electronic content, that the modification was inadvertent based on the prediction that the first user will not modify the first electronic content;
cause, in response to the determination that the modification was inadvertent, a first user interface element including a first option and a second option to be presented to the first user, the first option confirming that the modification was inadvertent and the second option confirming that the modification was intentional; and
present guidance to the user using the first machine learning model, the guidance identifying the modification made to the first electronic content and steps for recovering the modification to the first electronic content.

7. The device of claim 6, wherein the instructions further cause the one or more processors to:
create, in response to receiving a first user input indicating a selection of the first option, a new training data sample based on at least the first usage history and an indication the modification was unintentional;
add, at a first time, the new training data sample to a training data set; and
update, at a second time after the first time and using the training data set, the first machine learning algorithm.

8. The device of claim 6, wherein the instructions include second instructions that cause the one or more of processors to:
create, in response to receiving a second user input indicating a selection of the second option, a first training data sample based on at least the first usage history and an indication the modification was intended by the first user;
add the first training data sample to a training data set at a first time; and
update, at a second time after the first time and using the training data set, the first machine learning algorithm.

9. The device of claim 8, wherein the second instructions further cause the one or more of processors to:
detect a reversion, by the first user, of the modification;
remove, in response to the detection of the reversion, the first training data sample from the training data set, before the second time;
create, in response to the detection of the reversion, a second training data sample based on at least the first usage history and an indication the modification was unintentional; and
add the second training data sample to the training data set before the second time.

10. A device comprising:
one or more processors; and
one or more computer readable media including instructions which, when executed by the one or more processors, cause the one or more processors to:
determine that a first triggering event has occurred during access of a first electronic content, the first triggering event including a modification of a portion of the first electronic content by a first user from an initial state to a modified state;
determine, in response to the first triggering event, that the modification was inadvertent based on usage history comprising at least a usage history for the first user or a usage history for the first electronic content being indicative of the first user having unintentionally modified the first electronic content;
detect a period of inactivity by the first user following the modification of the first electronic content;
cause a first user interface element to be presented in response to the detection of the first period of inactivity and the determination that the modification was inadvertent, the first user interface element including a first option and a second option to be presented to the first user; and
revert, in response to receiving a first user input indicating a selection of the first option, the portion of the first electronic content from the modified state to the initial state.

11. A method comprising:
determining a prediction using a machine learning model trained to predict whether a first user will modify a first electronic content based on a usage history for a first user, a usage history for the first electronic content, or both, that the first user will not modify the first electronic content;
determining that a first triggering event has occurred during access of the first electronic content, the first triggering event including a modification of a portion of the first electronic content by the first user from an initial state to a modified state;

determining, in response to the first triggering event, that the modification was inadvertent based on usage history comprising at least a usage history for the first user or a usage history for the first electronic content;

causing, in response to detection of a first period of inactivity and the determination that the modification was inadvertent, a first user interface element including a first option and a second option to be presented to the first user, the first option confirming that the modification was inadvertent and the second option confirming that the modification was intentional; and present guidance to the user using the machine learning model, the guidance identifying the modification made to the first portion of the first electronic content and steps for recovering the portion of the first electronic content from the modified state to the initial state responsive to receiving a first user input indicating a selection of the first option.

12. The method of claim 11, wherein the method further comprises automatically reducing access of the first user to the first electronic content from a read-write access to a read-only access in response to receiving the first user input.

13. The method of claim 11, wherein the first user interface element is presented after a delay of at least two seconds following the modification of the portion of the first electronic content.

14. The method of claim 11, wherein the determination that the modification is inadvertent is further based on a determination that the modification includes a text-based typographical error.

15. The method of claim 11, wherein the determination that the modification is inadvertent is further based on a prediction, made prior to the modification, based on at least the usage history for the first user or usage history for the first electronic content that the accessed first electronic content will not be modified by the first user.

16. The method of claim 11, wherein the first user interface element includes a notification informing the first user that their most recent modification may include an inadvertent edit.

17. The method of claim 11, further comprising:
determining that a second triggering event has occurred during access of a first file, the second triggering event including a modification of a portion of the first file by a second user from an initial state to a modified state;

determining, in response to the second triggering event, that the modification was inadvertent based on at least a usage history for the second user before the access of the first file;

causing, in response to the determination that the modification was inadvertent, a second user interface element including a third option to record the modified state as a second file to be presented to the first user;

receiving a second user input indicating a selection of the third option;

creating, in response to receiving the second user input, a new file including the modified state of the first file; and maintaining, in response to receiving the second user input, the first file in its initial state.

18. The method of claim 11, wherein the usage history for the first user includes data indicating an amount of time since the first electronic content was modified by the first user.

19. The method of claim 11, wherein the usage history for the first user includes data indicating a number of occurrences that the first electronic content has been modified by the first user.

20. A method comprising:
determining that a first triggering event has occurred during access of a first electronic content, the first triggering event including a modification of a portion of the first electronic content by a first user from an initial state to a modified state;

determining, in response to the first triggering event, that the modification was inadvertent based on usage history, comprising at least a usage history for the first user or a usage history for the first electronic content, being indicative of the first user having unintentionally modified the first electronic content;

detecting a first period of inactivity by the first user following the first triggering event;

causing a first user interface element to be presented to the first user in response to the detection of the first period of inactivity and the determination that the modification was inadvertent, the first user interface element including a first option and a second option to be presented to the first user; and reverting, in response to receiving a first user input indicating a selection of the first option, the portion of the first electronic content from the modified state to the initial state.

* * * * *